US007085730B1

(12) United States Patent
Tsao et al.

(10) Patent No.: US 7,085,730 B1
(45) Date of Patent: Aug. 1, 2006

(54) WEIGHT BASED MATCHING OF SUPPLY AND DEMAND

(75) Inventors: Piao-Chuo Tsao, Bade (TW); Fa-Liang Wang, Hsin-chu (TW)

(73) Assignee: Taiwan Semiconductor Manufacturing Company, Hsin-chu (TW)

( * ) Notice: Subject to any disclaimer, the term of this patent is extended or adjusted under 35 U.S.C. 154(b) by 1148 days.

(21) Appl. No.: 09/989,803

(22) Filed: Nov. 20, 2001

(51) Int. Cl.
*G06Q 10/00* (2006.01)
(52) U.S. Cl. ...................................................... 705/10
(58) Field of Classification Search ................ 705/8, 705/10
See application file for complete search history.

(56) References Cited

U.S. PATENT DOCUMENTS

| 5,265,006 | A | * | 11/1993 | Asthana et al. | ............... | 705/8 |
| 5,369,570 | A | * | 11/1994 | Parad | ............................. | 705/8 |
| 5,765,143 | A | * | 6/1998 | Sheldon et al. | ............... | 705/28 |
| 5,796,614 | A | | 8/1998 | Yamada | ................. | 364/468.13 |
| 5,953,707 | A | * | 9/1999 | Huang et al. | .................. | 705/10 |
| 5,963,919 | A | * | 10/1999 | Brinkley et al. | ............... | 705/28 |
| 5,970,465 | A | | 10/1999 | Dietrich et al. | ................. | 705/7 |
| 5,991,732 | A | | 11/1999 | Moslares | ........................ | 705/8 |
| 6,049,742 | A | | 4/2000 | Milne et al. | ................... | 700/99 |
| 6,085,164 | A | * | 7/2000 | Smith et al. | ..................... | 705/5 |
| 6,151,582 | A | * | 11/2000 | Huang et al. | ................... | 705/8 |
| 6,889,197 | B1 | * | 5/2005 | Lidow | .......................... | 705/10 |
| 6,965,868 | B1 | * | 11/2005 | Bednarek | ......................... | 705/9 |
| 6,993,494 | B1 | * | 1/2006 | Boushy et al. | ................. | 705/10 |

FOREIGN PATENT DOCUMENTS

JP 62120961 A * 6/1987

OTHER PUBLICATIONS

Business Editors/Computer Writers, "AutoSimulations Introduces Static Capacity Modeler: For Rough Cut Capacity and Investment Analysis", Dec. 14, 1998, Business Wire, p. 1, ProQuest ID 37091576.*
Bermon, Stuart; Hood, Sarah Jean; "Capacity Planning Optimization System (CAPS)", Sep./Oct. 1999, Interfaces, ABI/INFORM Global, pp. 31-50.*
Roberts, Bill; "Creating a Virtual Factory", Nov. 1, 1999, Internet World, vol. 5, Iss. 32, p. 48, ProQuest ID 46081947.*
"PRI Scheduling Software Selected by TSMC at Fab 5", Feb. 16, 1999, PRNewswire, New York, p. 1, ProQuest ID 38981281.*
Swaminathan, Jayashankar M; Smith, Stephen F; Sadeh, Norman M; "Modelling supply chain dynamics: A multiagent approach", Summer 1998, Decision Sciences, 29, 3; ABI/INFORM Global, p. 607.*

(Continued)

*Primary Examiner*—Tariq Hafiz
*Assistant Examiner*—Jonathan G Sterrett

(57) ABSTRACT

A new software support system provides an efficient system of balancing demand versus supply in order to achieve maximum possible revenue in combination with the best possible customer service, this in accordance with semiconductor manufacturing principles and conventions of business operation.

36 Claims, 1 Drawing Sheet

OTHER PUBLICATIONS

Wah, Louisa; "ULTIMATE Manufacturing", Sep. 1999, Management Review, 88, 8, ABI/INFORM Global, p. 14.*

PRNewswire, "History meets the future at Stora with the Addition of logility Value Chain Solutions", Mar. 23, 1998, PO323ATM012, Dialog 05525057 48374065.*

Onwubolu, Godfrey C.; Mhlanga, Samson, "POM: a highly visual production and operations management environment", 1997, Industrial Management + Data Systems, v97n3, pp. 99, Dialog 02398052 117542211.*

* cited by examiner

WEIGHT BASED MATCHING OF SUPPLY AND DEMAND

BACKGROUND OF THE INVENTION (1) Field of the Invention

The invention relates to the fabrication of integrated circuit devices, and more particularly, to a method to optimize semiconductor production based on marketing forecasts.

(2) Description of the Prior Art

The art of creating semiconductor devices requires the support of not only technical disciplines but in addition requires a number of supporting functions that have a profound impact on for instance production volume and production profitability.

Typically addressed in the field of semiconductor devices are the numerous interacting and mutually supporting technical disciplines that are required for the creation of semiconductor devices. Equally important in support of technical capabilities and activities are required functions that allow for the creation of semiconductor devices in an organized and well-controlled manner. This aspect of semiconductor manufacturing is frequently addressed by software support packages, which are available under a variety of acronyms and that are provided by a relatively large number of software vendors. Such systems are typically and in the most general meaning required to provide on a real-time basis all information of logistics and product flow that relates to the semiconductor manufacturing operation. For instance: what product is currently being produced using what tools and facilities, what for a particular product is the product yield, what are the yield detractors and are these yield detractors changing with time, tool status such as which tools are operational, which tools must be scheduled for Preventive Maintenance, status of new tools ordered and a plan to integrate new tools into current operations, and numerous other records that for instance effect purchasing, basic material supplies and the re-ordering of same, etc.

The overall objective of information handling that is associated with the manufacturing of semiconductor devices is cost control. Since one of the main factors that contribute to product cost is incurred by the tools or production facilities that are required to create semiconductor devices, control of these tools and production facilities is essential to the success of a semiconductor manufacturing facility. In a typical semiconductor production environment, device production is based on sales forecast with as ultimate objective the achieving of the highest possible revenue. It is thereby common practice to first answer to the production demands that are imposed by the most important customers and by the scheduling of production tools that are primarily used for the production for these most important customers. This does not imply that all production tools are at all times used to the maximum extent possible or even that all production tools are used in the most cost-effective manner. Excess capacity can therefore be used to also serve other customers. In many cases, the selection of what to produce and for which customer product is best scheduled is performed on a per-case basis, frequently short-term based and performed manually (ad hoc). Where an unlimited productive capability is present or where the number of customers that needs to be served is limited, this ad hoc approach can be followed with reasonable success, even though it may be argued that a cost competitive operation in this case will be difficult to establish. A more realistic approach is required for cases where production capacity is finite and where a relatively large number of customers is to be served. This latter situation is prone to result in poor customer service and in long delays in product deliveries. It is therefore of importance to the profitability of a semiconductor foundry to balance supply and demand, the invention addresses this issue by providing a method of balancing demand versus supply by way of dynamically selecting the most "valuable" demands from the pool of customers and matching these demands with available production capacity.

U.S. Pat. No. 6,049,742 (Milne et al.) shows a supply chain program for semiconductor plants.

U.S. Pat. No. 5,796,614 (Yamada) shows a MRP system.

U.S. Pat. No. 5,991,732 (Moslares) and U.S. Pat. No. 5,970,465 (Dietrich et al.) are related patents.

U.S. Pat. No. 6,049,742 (Milne et al.) address projected supply planning matching assets with demand in microelectronics manufacturing.

SUMMARY OF THE INVENTION

A principle objective of the invention is to reduce product cost by balancing customer demand against available production capacity.

Another objective of the invention is to schedule production based on available production capacity.

Yet another objective of the invention is to create and maintain a base of customer data that is used for scheduling of future production.

A still further objective of the invention is to provide an efficient system of balancing demand versus supply in order to achieve maximum possible revenue in combination with the best possible customer serve, this in accordance with established semiconductor manufacturing principles and conventions of business operation.

In accordance with the objectives of the invention a new software support system is defined, which provides an efficient system of balancing demand versus supply in order to achieve maximum possible revenue in combination with the best possible customer serve, this in accordance with semiconductor manufacturing principles and conventions of business operation.

DESCRIPTION OF THE PREFERRED EMBODIMENTS

Figure 1:
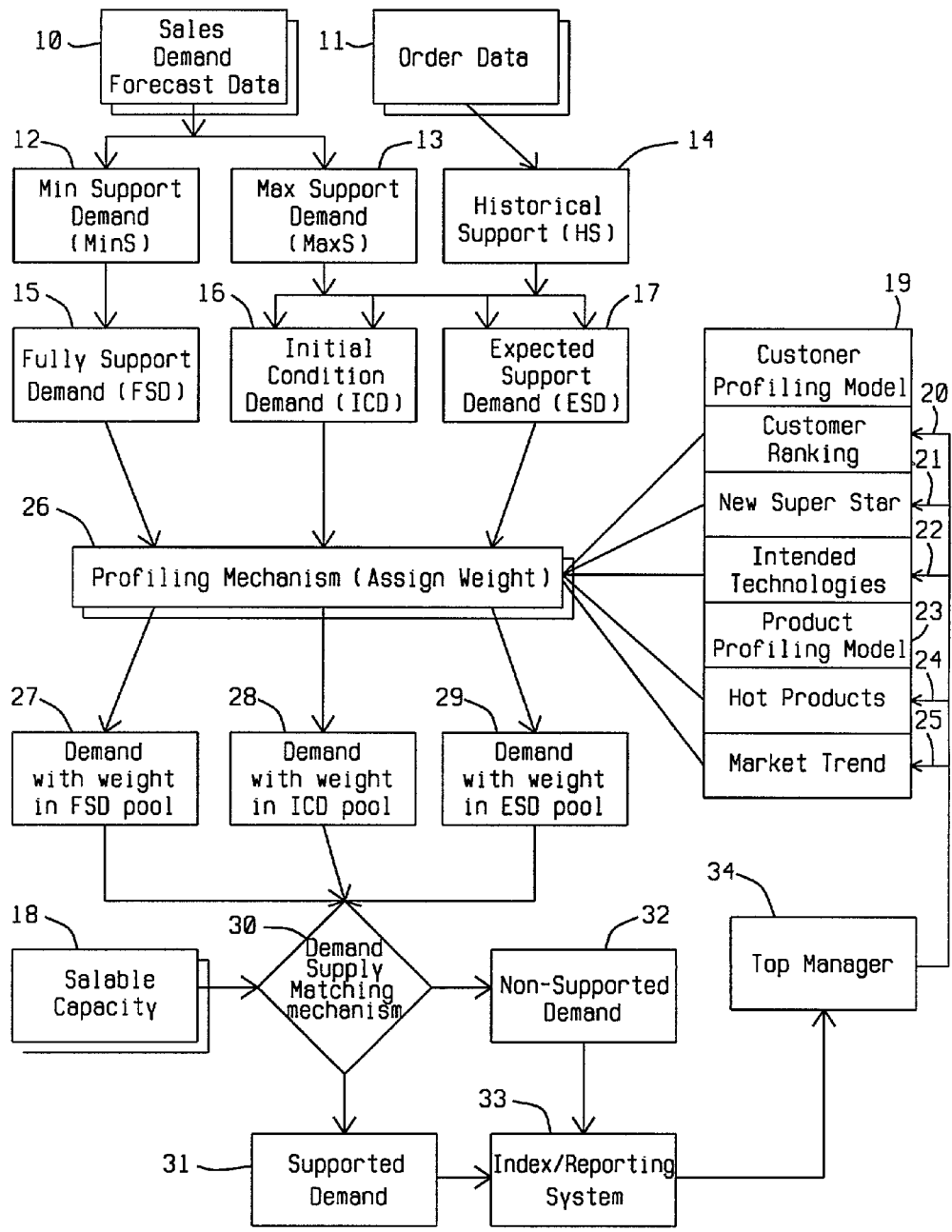
FIG. 1 is the one and only drawing that is part of this application, shown in FIG. 1 is a flow diagram of the software support system of the invention.

The basic approach that is followed by the (weight based) Matching of Supply and Demand (MSD) system of the invention follows the following guidelines:

question: which customer demand should be supported first?

answer: the customer/demand that is judged to be the most desirable customer/demand to the supplier (foundry) of the semiconductor devices.

Based on this question and answer principle, the MSD system:

collects the demands or product orders that are placed on the supplier of the semiconductor devices (the semiconductor manufacturing facility or foundry) by the customer assigns a demand value or score to the forecast demand, this demand value or score is based on product attributes and supplier (foundry) policy selects the forecast demand to which a highest score is assigned.

It is realized that the effectiveness of the MSD system hinges on the second of the above indicated items, that is the assigning of a demand value or score which is based on product attributes and supplier (foundry) policy. This demand value or score is a semiconductor foundry management tool and is a parameter that has been developed over time by management of the semiconductor manufacturing operations, the demand value or score can be adjusted if it is required to do so by changing circumstances or operational conditions. It must however be realized that even such a seemingly arbitrary parameter can be of value if this parameter is consistently applied and after this parameter has been implemented and used over a period of time. With product attributes is meant such product related items as past product profitability, overall marketing demand of a product and the therewith associated likely future profitability of a product, current and projected future demands of the product and current and future demands of related products that place demands on production facilities that must be shared with the product under evaluation. In short: what likely profit will the product produce for the foundry?

Supplier (foundry) policy includes such items as past experience with the customer (is the customer demanding, does the customer meet his/her financial obligations in a timely manner, has the customer in the past changed or cancelled orders, what effect will supplying the customer have on the market position of the foundry, and the like). In short: how easy or difficult is it to supply a customer with an order?

Keeping the above-indicated operational principles in mind, the MSD system functions as follows.

1. At the time that a sales representative wants to place a customer forecast that is to be executed in the near future (such as the following year), the sales representative must assign the forecast demand with to one of categories. By performing this assignment, the sales representative performs the function of "Sales Demand Forecast Data", element 10 in FIG. 1. The two categories to be assigned are:

(i) provide Minimum Support, this means that the customer commits to place an order for a minimum quantity of devices; see function "Min Support Demand (MinS)", function 12, FIG. 1

(ii) provide Maximum Support, this means that the customer likes to have the ordered number of devices in the near future, but that the customer is unwilling to commit to this quantity at this time; see function "Max Support Demand (MaxS)", entry 13, FIG. 1. It must thereby be realized that MinS is part of MaxS for the following reason: if a customer has a demand for a product of for instance 1,000 units per month, yet the customer is at this time willing to commit to only 400 units per month of this product. However the customer also reasonably expects to in fact require 1,000 units of this product. The quantity of 1,000 units is then divided into two separate quantities, that is MinS=400 and MaxS=1,000. This makes MinS "part of" MaxS.

2. At the same time of the placement of the order, the MSD system creates a new support record, the Historical Support (Initial Condition) record or HS, using the Historical Order Data as input to this function. The Historical Support record is based on the quantity of product that has been ordered by the customer during the past two months, the past six months (half a year) or even a one year period. It is a record of customer reference data reflecting a serious effort to provide the customer with at least the same product delivery in order to maintain good customer service. This function is shown in FIG. 1 as functions "Historical Support (HS)", element 14, FIG. 1, using as input record the "Order Data", entry 11 in FIG. 1

3. The design of Historical Support record (HS record 14, FIG. 1) is very important to the foundry business since most foundries like to maintain a long business relationship with customers. The basic rule that must therefore be followed is to at least provide the customer with a minimum production output (foundry capacity) during this year and following years. The design of the Historical Support record commits to this customer that the customer will be served first and in preference to other customers.

4. The MSD system fetches the customer demand data (records 12, 13 and 14, FIG. 1) and divides them into three groups:

(i) Fully Support the demand, this is equal to the Minimum Support of the sales demand forecast data; record 15, FIG. 1, "Fully Support Demand (FSD); this can be expressed as $FSD^i_n = MinS^i_n$, where $FSD^i_n$ is The ith Fully Support Demand of Customer n while $MinS^i_n$ is the ith Min Support demand of Customer n on the Demand Forecast system; and (ii) Initial Condition, this is equal to the original Historical Supported quantity minus the Minimum Support quantity of the sales demand forecast data; see record 16, FIG. 1, "Initial Condition Demand (ICD); the minimal value of Initial Condition must be greater or equal to zero; this can be expressed as $ICD^i_n = HS^i_n - MinS^i_n$, where $HS^i_n$ is the ith Historical support data of Customer n on the order system (the value of $HS^i_n$ can be zero for a customer who has no experience of a particular product, in that case no historical data can be referenced), and (iii) Expected Support, this is equal to the Maximum Support minus the Fully Support Demand and the Initial Condition Demand; record 17, FIG. 1, "Expected Support Demand (ESD)"; this can be expressed as $ESD^i_n = MaxS^i_n - (FSD^i_n + ICD^i_n)$, where $MaxS^i_n$ is the ith Max Support demand of Customer n on the Demand Forecast system. As an example, if Max=1,000, Min=400 and HS can be equal to 500 (case #1) or to 300 (case #2), then for case #1: HS=500 then FSD=400, ICD=100, ESD=500; for case #2: HS=300 then FSD=400, ICD=0, ESD=600.

5. In addition, current salable capacity data and future capacity plan information must be prepared in order to performed the matching of Demand and Supply with the customer demand; record 18, FIG. 1, "Salable Capacity".

6. A Customer Profiling Model is provided and maintained by the MSD system in order to identify the value of each customer; function 19, FIG. 1, "Customer Profiling Model". This model includes indexes to help top management and sales managers to identify relationships between customers, the major technologies of the foundry and the potential of new start-up customers. The Customer Profiling Model includes the following indexes:

Customer Ranking, function 20, FIG. 1: For most customers, the foundry prefers to assign a ranking number to the customer in order to identify the importance of the customer to the foundry. The ranking number reflects the weight of a customer to the foundry New Super Stars, function 21, FIG. 1: For some start-up design houses that have excellent products where however it is difficult for these start-up companies to gain enough capacity from semiconductor foundries. A foundry evaluates the potential of the start-up design house and provides adequately capacity to these start-up design houses. All start-up design houses in this index would be assigned one weight Planned or Intended Technologies of the foundry, function 22, FIG. 1: the foundry has a technology plan, the foundry evaluates whether the customer can transfer the customer product to intended technology of the foundry. In this case, the product that is most likely to switch to the advanced technology of the foundry will be supported first. Different or none-transferable technologies in this index will be assigned a different weight.

7. The MSD system also provides and maintains a Product Profiling Model to identify the value of each new product, which is in great demand; function 23, FIG. 1. This model includes indexes to help top management and sales managers to point out the market trend in near the future and the future products that are expected to be in demand. The Product Profiling Model includes the following indexes:

"Hot" Products, this index maintains the products that the foundry is likely to fully support; record 24, FIG. 1. All products in this index receive the same weight Market Trend, record 25, FIG. 1. This index addresses the expected impact on the market of products that are still being developed. An alternative way is to define the overall market, such as ADSL chips and PDA chips. All Products developed for this market will be supported the same as other product. A weight will also be assigned to the products in this index.

8. Before the Demand-Supply matching is performed by the MSD system of the invention, the Profiling Mechanism, function 26, FIG. 1, "Profiling Mechanism (Assign weight)", assigns, in accordance with management and operational principles and guidelines that have been established by the foundry, a weight to each demand, as follows:

the Fully Support Demand pool, function 27 in FIG. 1, "Demand with weight in FSD pool"

the Initial Condition Demand pool, function 28 in FIG. 1, "Demand with weight in ICD pool" and the Expected Support Demand pool, function 29 in FIG. 1, "Demand with weight in ESD pool".

Each demand searches for the items in the profiling indexes, that is the Customer Profiling Model 19 and the Product Profiling Model 23. If a demand meets the criteria in these indexes, this demand gets the weight that belongs to this index. After going through all indexes, a weight has been assigned to all demands. The weight of each demand includes the impact of the demand on the foundry. Guidelines that can be followed in assigning weight are the following:

Assign a weight of 0 to all demands.

Assign a weight value to Hot Products. Assign a weight value to products belonging to the Market Trend.

Assign a weight value to New Super Star products.

Assign a weight value to the products that belong to the Planned or Intended Technology of the foundry.

Assign weight to products belonging to different customers.

9. The Demand-Salable Capacity matching algorithm, function 30, FIG. 1, divides the submitted demands into Supported Demand, record 31, FIG. 1 and Non-supported Demand, record 32, FIG. 1 and is the arbiter in deciding which demand will be supported first. Each selected demand consumes part of the salable capacity of the foundry, the Demand-Supply Capacity matching algorithm 30 stops selection or assignment of salable capacity after all salable capacity has been assigned or consumed.

10. The resulting Supported Demands (31) and the Non-Supported (32) Demands records that are provided by function 30, the D-S Matching function, are combined in an Index/Reporting Function, function 33 in FIG. 1. These results are made available to foundry management, function 34, FIG. 1, from where the matching of foundry production with orders placed can be monitored and adjusted if required to do so, by means of input to the customer profiling model 19 and the product profiling model 23. Records 20, 21, 22, 24 and 25 can be adjusted for this purpose by management.

The Index/Reporting function creates a performance index that is assigned to each item (such as a forecast demand or a product) that top management elects to monitor. This performance index assists management in understanding developments in customer demand, foundry utilization for a technology and the demands that are imposed by new technologies. In addition, summary reports can be created based on manager requirement. These reports provide management with adequate information for the tracking of customer demand and the support ratio that is in force for each customer.

11. After viewing these indexes and reports, foundry management is in a position to change the Customer Profiling Model or to request that marketing personal modify the Product Profiling Model after which the modified rules are used by the MSD system to again exercise the D-S Matching Mechanism 30, creating a different operational environment. This feedback mechanism can also be used to change the use of the MSD system and to use the system as a simulation tool, assuming different versions of the Customer Profiling Model 19. The MSD system in this case needs to create a comparative report of the two matching results, assisting management in identifying required alternate approaches.

Following is a summary of the records and parameters that are used by the MSD system, as defined above:

$FSD^i_n = MinS^i_n$ $ICD^i_n = HS^i_n - MinS^i_n$ $ESD^i_n = MaxS^i_n - (FSD^i_n + ICD^i_n)$ $MinS^i_n$ = the ith Min Support demand of Customer n on the Demand Forecast system $MaxS^i_n$ = the ith Max Support demand of Customer n on the Demand Forecast system $HS^i_n$ = the ith Historical support data of Customer n on the order system $FSD^i_n$ = The ith Fully Support Demand of Customer n $ICD^i_n$ = The ith Initial Condition Demand of Customer n $ESD^i_n$ = The ith Expected support Demand of Customer n The MSD system of the invention can be summarized as follows:

1. In according with the importance of a customer, the future of a product and business assumptions and guidelines, a weight is assigned to each customer demand. This function is performed by the Customer Profiling Model and the Product Profiling Model in the MSD system 2. Based on the weight of each demand, the most valuable demand is selected by the Demand versus Salable Capacity matching function of the MSD system
3. A Historical Support records is maintained to assure that a reasonable quantity of product can be assigned to specific customers during a future period of time, thus trying to maintain a similar customer support pattern
4. An Index/Reporting function provides a performance index and reporting capability as a tool for management to control future foundry operations.
5. The MSD system can be used as a simulation tool based on management input and directives in order to chart an optimum balancing between present and future customer demands and foundry production capabilities.

Although the invention has been described and illustrated with reference to specific illustrative embodiments thereof, it is not intended that the invention be limited to those illustrative embodiments. Those skilled in the art will recognize that variations and modifications can be made without departing from the spirit of the invention. It is therefore intended to include within the invention all such variations and modifications which fall within the scope of the appended claims and equivalents thereof.

What is claimed is:

1. A computer implemented decision support method of matching supply and demand between customer forecast demands and semiconductor foundry manufacturing capacity, comprising the steps of:
   (1) providing Sales Demand Forecast Data, dividing said Sales Demand Forecast Data into categories:
     (i) providing a Minimum Support record;
     (ii) providing a Maximum Support record;
   (2) providing Order Data, creating a Historical Support record or HS, using the Order Data as input to this function;
   (3) using said Minimum Support record and said Maximum Support record and said Historical Support record as input records, dividing said three records into:
     (i) Fully Support Demand record;
     (ii) Initial Condition Demand record; and
     (iii) Expected Support Demand record;
   (4) providing current salable capacity data and future capacity plan data;
   (5) providing Customer Profiling Model data, said Customer Profiling Model data being sub-divided into categories of:
     (i) Customer Ranking;
     (ii) New Super Stars; and
     (iii) Planned or Intended Technologies of a foundry;
   (6) providing a Product Profiling Model record, said Product Profiling Model comprising indexes:
     (i) "Hot" Products; and
     (ii) Market Trend;
   (7) assigning a weight to each demand, creating future capacity plan data, said weight to each demand being:
     (i) a Fully Support Demand pool;
     (ii) an Initial Condition Demand pool; and
     (iii) an Expected Support Demand pool;
   (8) using a Demand-Supply matching algorithm, dividing submitted demands of Fully Support Demand, Initial Condition Demand pool and Expected Support Demand pool into Supported Demand and Non-supported Demand, said algorithm being an arbiter in deciding which demand will be supported first, whereby the Demand-Supply matching algorithm stops selection or assignment of salable capacity after all salable capacity has been assigned or consumed; and
   (9) combining Supported Demands and Non-Supported Demands, provided by the Demand-Supply matching algorithm, using an Index/Reporting Function, making combined results available to foundry management, thereby monitoring and adjusting of foundry production with orders placed, said monitoring and adjusting being performed by means of input to the customer profiling model and the product profiling model, indexes of the Customer Profiling Model and the Product Profiling Model being adjustable by management.

2. The method of claim 1 wherein said providing Minimum Support represents a customer commitment of placing an order for a minimum quantity of semiconductor devices.

3. The method of claim 1 wherein said providing Maximum Support comprises a customer desire of placing an order for a number of semiconductor devices in a near future, the customer being unwilling to commit to this quantity at this time.

4. The method of claim 1, said Historical Support record comprising a quantity of product having been ordered by a customer during past two months or past six months or a one year period, said Historical Support record being a record of customer reference data reflecting an effort of providing the customer with at least a same product delivery in order to maintain good customer service, striving to provide the customer with a minimum production output during a current year and following years, thereby committing to the customer that the customer will be served first and in preference to other customers.

5. The method of claim 1, said Fully Support Demand Record being a customer record that is equal to the Minimum Support record of said customer.

6. The method of claim 1, said Initial Condition record being equal to said Historical Supported record minus the Minimum Support record.

7. The method of claim 1, said Expected Support record being equal to the Maximum Support record minus the Fully Support record and the Initial Condition record.

8. The method of claim 1, said using a Demand-Supply matching algorithm comprises using current salable capacity data and future capacity plan data, said data being prepared in order to provide matching of Demand and Supply with a customer demand.

9. The method of claim 1, said Customer Ranking being assigning a ranking number to a customer in order to identify importance of the customer to the foundry, thereby reflecting the weight or importance of a customer.

10. The method of claim 1, said New Super Stars comprising start-up design houses having excellent products, said start-up houses having difficulties in gaining adequate production capacity from semiconductor foundries, said semiconductor foundries evaluating potential of the start-up design house and providing adequate production capacity to these start-up design houses, whereby all start-up design houses are assigned one weight.

11. The method of claim 1, said Planned or Intended Technologies of a foundry comprising evaluating whether a customer can transfer a customer product to an intended technology of a foundry, giving priority production support to a product that is most likely to switch to advanced technology of the foundry, a different weight being assigned to different or none-transferable technologies.

12. The method of claim 1, said Product Profiling Model identifying a value of each new product, including indexes to help top management and sales managers to point out a market trend in near a future and future products that are expected to be in demand.

13. The method of claim 1, said "Hot" Products being products that a foundry is likely to fully support, whereby all products in this index receive the same weight.

14. The method of claim 1, said Market Trend addressing expected impact on a market of products that are still being developed, a weight being assigned to products in this index.

15. The method of claim 1, said assigning a weight to each demand comprises assigning a weight in accordance with management and operational principles and guidelines that have been established by a foundry, whereby each demand searches for items in the profiling indexes, that is the Customer Profiling Model and the Product Profiling Model, a demand meeting a criteria in these indexes being assigned a weight belonging to this index, said weight reflecting impact of the demand on a foundry.

16. The method of claim 15, said weight being assigned using as ground-rules:
   assign a weight of 0 to all demands;
   assign a weight value to Hot Products;
   assign a weight value to products belonging to a Market Trend;
   assign a weight value to New Super Star products;
   assign a weight value to products that belong to a Planned or Intended Technology of a foundry; and
   assign weight to products belonging to different customers.

17. The method of claim 1, additionally using the MSD system as a simulation tool, establishing different versions of the Customer Profiling Model and the Product Profiling Model, creating comparative reports of various different versions, assisting management in identifying required alternate approaches of matching production capabilities with sales demand.

18. A computer implemented system matching supply and demand between customer forecast demands and semiconductor foundry manufacturing capacity, comprising:
   (1) Sales Demand Forecast Data, Record means for dividing said Sales Demand Forecast Data Record into categories:
      (i) a Minimum Support record;
      (ii) a Maximum Support record;
   (2) Order Data Record means for creating a Historical Support record or HS, using the Order Data as input to this function;
   (3) means for using said Minimum Support record and said Maximum Support record and said Historical Support record as input records, dividing said three records into:
      (i) Fully Support record;
      (ii) Initial Condition record; and
      (iii) Expected Support record;
   (4) means for determining current salable capacity data and future capacity plan data record;
   (5) means for providing a Customer Profiling Model Data Record, said Customer Profiling Model Data Record being sub-divided into categories of:
      (i) Customer Ranking;
      (ii) New Super Stars; and
      (iii) Planned or Intended Technologies of the foundry;
   (6) means for providing a Product Profiling Model record, said Product Profiling Model comprising indexes:
      (i) "Hot" Products; and
      (ii) Market Trend;
   (7) means for assigning a weight to each demand, said weight to each demand being:
      (i) a Fully Support Demand pool;
      (ii) an Initial Condition Demand pool; and
      (iii) an Expected Support Demand pool;
   (8) means for using a Demand-Supply matching algorithm, dividing submitted demands of Fully Support Demand pool, Initial Condition Demand pool and Expected Support Demand pool into Supported Demand and Non-supported Demand, said algorithm being an arbiter in deciding which demand will be supported first, whereby the Demand-Supply matching algorithm stops selection or assignment of salable capacity after all salable capacity has been assigned or consumed; and
   (9) means for combining Supported Demands and Non-supported Demands, provided by the Demand-Supply matching algorithm, using an Index/Reporting Function, making combined results available to foundry management, thereby monitoring and adjusting of foundry production with orders placed, said monitoring and adjusting by means of an input device to the customer profiling model and the product profiling model, indexes of the Customer Profiling Model and the Product Profiling Model being adjustable by management.

19. The system of claim 18, said means for providing Minimum Support record comprising a customer commitment of placing an order for a minimum quantity of semiconductor devices.

20. The system of claim 18, said providing Maximum Support record comprising a customer desire of placing an order for a number of semiconductor devices in a near future, the customer being unwilling to commit to this quantity at this time.

21. The system of claim 18, said Historical Support record comprising a quantity of product having been ordered by a customer during past two months or past six months or a one year period, said Historical Support record being a record of customer reference data reflecting an effort of providing the customer with at least a same product delivery in order to maintain good customer service, striving to provide the customer with a minimum production output during a current year and following years, thereby committing to the customer that the customer will be served first and in preference to other customers.

22. The system of claim 18, said Fully Support Demand Record being a customer record that is equal to the Minimum Support record of said customer.

23. The system of claim 18, said Initial Condition record being equal to said Historical Supported record minus the Minimum Support record.

24. The system of claim 18, said Expected Support record being equal to the Maximum Support record minus the Fully Support demand and the Initial Condition demand.

25. The system of claim 18, said a Demand-Supply matching algorithm comprises using current salable capacity data and future capacity plan data, said data being prepared in order to provide matching of Demand and Supply with a customer demand.

26. The system of claim 18, said Customer Ranking being assigning a ranking number to a customer in order to identify importance of the customer to the foundry, thereby reflecting the weight or importance of a customer.

27. The system of claim 18, said New Super Stars comprising start-up design houses having excellent products, said start-up houses having difficulties in gaining adequate production capacity from semiconductor foundries, said semiconductor foundries evaluating potential of the start-up design house and providing adequate production capacity to these start-up design houses, whereby all start-up design houses are assigned one weight.

28. The system of claim 18, said Planned or Intended Technologies of a foundry comprising evaluating whether a customer can transfer a customer product to an intended technology of a foundry, giving priority production support to a product that is most likely to switch to advanced technology of the foundry, a different weight being assigned to different or none-transferable technologies.

29. The system of claim 18, said Product Profiling Model identifying a value of each new product, including indexes to help top management and sales managers to point out a market trend in a near future and future products that are expected to be in demand.

30. The system of claim 18, said "Hot" Products being products that a foundry is likely to fully support, whereby all products in this index receive the same weight.

31. The system of claim 18, said Market Trend addressing expected impact on a market of products that are still being developed, a weight being assigned to products in this index.

32. The system of claim 18, said weight assigned to each demand comprises assigning a weight in accordance with management and operational principles and guidelines that have been established by a foundry, whereby each demand provides means for searching for items in the profiling indexes, that is the Customer Profiling Model and the Product Profiling Model, a demand meeting a criteria in these indexes being assigned a weight belonging to this index, said weight reflecting impact of the demand on a foundry.

33. The system of claim 18, said weight being assigned using as ground-rules:
   assign a weight of 0 to all demands;
   assign a weight value to Hot Products;
   assign a weight value to products belonging to a Market Trend;
   assign a weight value to New Super Star products;
   assign a weight value to products that belong to a Planned or Intended Technology of a foundry; and
   assign weight to products belonging to different customers.

34. The system of claim 18, further comprising means for using the MSD system as a simulation tool, establishing different versions of the Customer Profiling Model and the Product Profiling Model, creating comparative reports of various different versions, assisting management in identifying required alternate approaches of matching production capabilities with sales demand.

35. The method of claim 1, said Customer Profiling Model being provided and maintained by the MSD system in order to identify the value of each customer, said Customer Profiling Model comprising indexes to help top management and sales managers to identify relationships between customers, the major technologies of the foundry and the potential new start-up customers, said Customer Profiling Model including indexes of Customer Ranking reflecting the weight of a customer to the foundry, New Super Stars reflecting a foundry evaluation of the potential of a start-up design house and providing adequate capacity to these start-up design houses while assigning a weight to all start-up design houses, Planned or Intended Technologies of the foundry reflecting the foundry evaluation of whether a customer can transfer customer product to an intended technology of the foundry whereby product that is most likely to switch to advanced technology the foundry will be supported first while different or non-transferable technologies in this index will be assigned a different weight.

36. The system of claim 18: said Customer Profiling Model being provided and maintained by the MSD system in order to identify the value of each customer, said Customer Profiling Model comprising indexes to help top management and sales managers to identify relationships between customers, the major technologies of the foundry and the potential of new start-up customers, said Customer Profiling Model including indexes of Customer Ranking reflecting the weight of a customer to the foundry, New Super Stars reflecting a foundry evaluation of the potential of a start-up design house and providing adequate capacity to these start-up design houses while assigning a weight to all start-up design houses, Planned or Intended Technologies of the foundry reflecting the foundry evaluation of whether a customer can transfer customer product to an intended technology of the foundry whereby product that is most likely to switch to advanced technology of the foundry will be supported first while different or non-transferable technologies in this index will be assigned a different weight.

* * * * *